Patented Dec. 18, 1928.

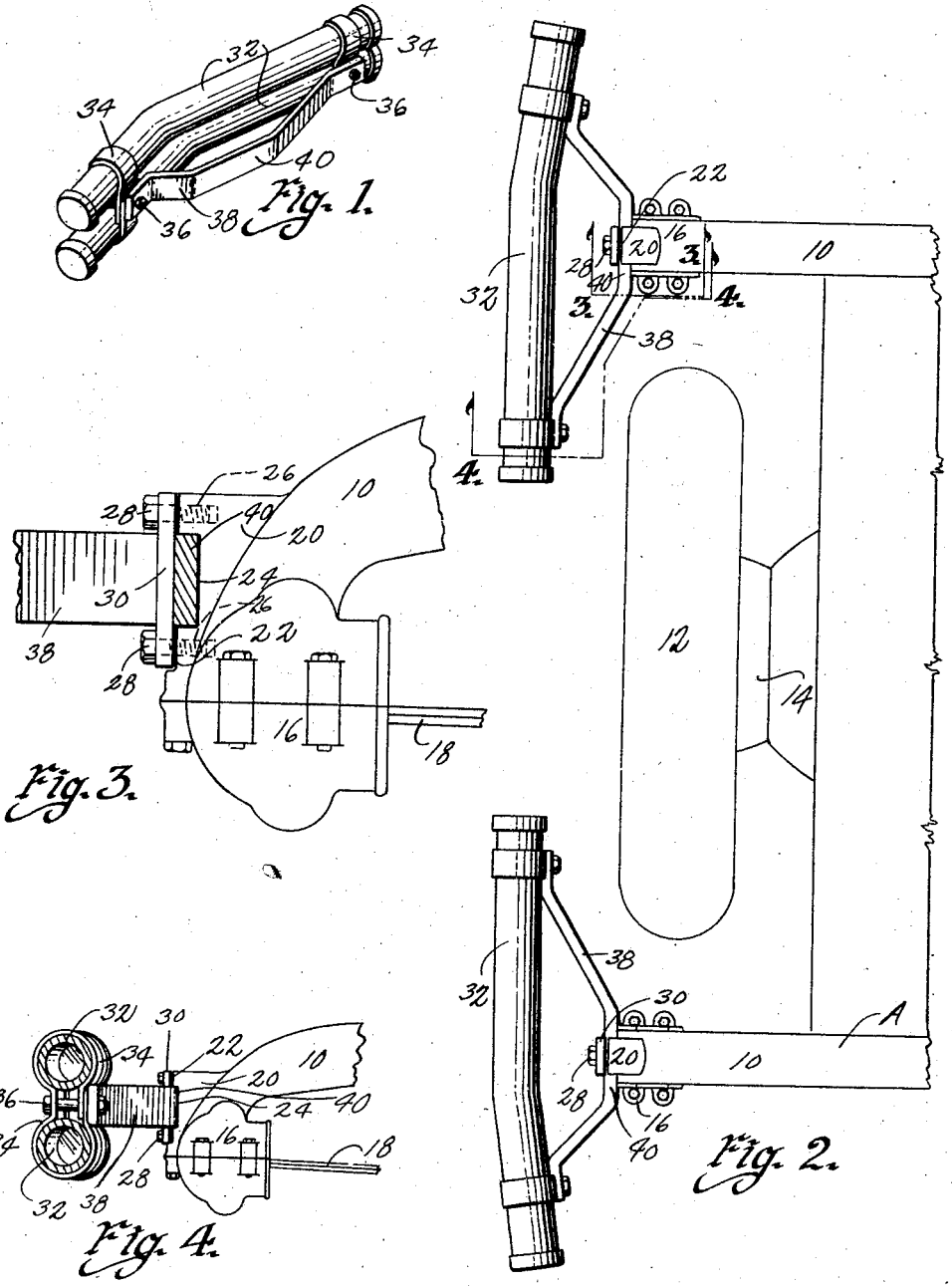

1,695,602

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER MOUNTING.

Application filed February 16, 1928. Serial No. 254,687.

The object of my invention is to provide a bumper mounting of simple, durable and comparatively inexpensive construction.

More particularly it is my object to provide a bumper mounting for supporting a pair of tubular bumper elements of the quarter type upon the rear ends of the chassis of an automobile for protecting the rear fender thereof.

Still a further object is to provide a bumper support formed of flat bar stock having an intermediate portion arranged at substantially right angles to the sides of the chassis of the automobile and adapted to be received in a channel shaped groove formed upon the ends of the chassis wherein the bumper support may be clamped in position and thereafter held against undesired movement in any direction.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a perspective view of my improved bumper mounting and bumper elements.

Figure 2 is a top plan view of the rear end of an automobile with my bumpers mounted thereon.

Figure 3 is a sectional view taken on the line 3—3 of Figure 2; and

Figure 4 is a detail sectional view taken on the line 4—4 of Figure 2.

In the accompanying drawings I have used the reference character A to indicate generally the chassis of an automobile and 10 the side frame members thereof. The side frame members 10 project out beyond the rear end of the automobile body proper and between the ends so projected is mounted a spare tire 12 upon a suitable holder 14.

The rear ends of the side frame members 10 of the chassis A have shackle housings 16 connected thereto in which are extended the automobile springs 18. Upon the rear end of each of the side frames 10 and forming part of the shackle housing casting, is a fitting 20. The fitting 20 has a flat face 22 provided with a recessed opening 24. The recessed opening 24 extends transversely of the side frame members 10 and is formed in the fitting portion 20.

The opening 24 may be said to be a channel shaped groove. Above and below the groove 24 in the fitting 20 are the screw threaded openings 26 for receiving bolts or the like 28. The bolts 28 extend through a clamp plate 30.

My improved bumper includes a pair of tubular bumper elements 32 connected together by double loop elements 34. The double loop elements 34 are formed of a single piece of material bent to provide a pair of loops for receiving the bumper elements 32 and the ends thereof are lapped over each other for receiving a bolt connection 36 as clearly shown in Figure 4 of the drawings.

A flat bar support 38 has its ends connected to the bolts 36 and thus to the double loop elements 34. The support 38 is formed of flat bar stock and has an intermediate portion 40 which is normally adapted to be positioned at substantially right angles to the side frame members 10.

The support 38 further includes inclined portions which extend outwardly from the ends of the intermediate flat portion 40 for connection with the bumper elements proper. The bumper elements 32 are thus positioned or spaced away from the intermediate portion 40 of the support 38. The intermediate portion 40 of the support 38 is adapted to be received in the recessed opening or channel shaped groove 24 of the fitting 20.

The clamping member 30 when positioned against the intermediate portion 40 and bolted to the fitting 20 will serve to rigidly hold the entire bumper in position. The channel shaped groove in the fitting 20 is of sufficient size to receive the flat intermediate portion 20 for preventing any pivotal movement of the bumper or any play thereof.

The bumper however, may be shifted transversely of the frame 10 before the clamping element 30 is securely tightened against the bumper support. This allows for movement of the entire bumper element for securing various adjustments when desired.

Some changes may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:

1. In combination with the chassis of an automobile having a recessed opening formed therein, of a bumper comprising a pair of spaced tubular bumper elements, a support having its ends connected at spaced points to said bumper elements, the intermediate portion of said support fitting into said recessed opening and means for clamping it therein.

2. In combination with the chassis of an automobile having a recessed opening formed therein, of a bumper comprising a pair of spaced tubular bumper elements, a flat bar support having its ends connected at spaced points to said bumper elements, the intermediate portion of said support fitting into said recessed opening and means for clamping it therein for preventing pivotal movement of the bumper.

3. In combination with the chassis of an automobile having a channel shaped transverse groove formed therein, of a bumper comprising a pair of spaced tubular bumper elements, means for connecting said elements together, a flat bar support having its ends connected to said means, the intermediate portion of said support fitting into said groove and a clamp element for retaining it therein.

4. In combination with the chassis of an automobile having a channel shaped transverse groove formed therein, of a bumper comprising a pair of spaced tubular bumper elements, means for connecting said elements together, a flat bar support having its ends connected to said means, the intermediate portion of said bumper being arranged at substantial right angles to the sides of the chassis and fitting into said groove whereby the support may be transversely adjusted relative to the chassis and a clamp plate extending over the support and connected to the chassis for frictionally engaging said support and preventing undesired transverse movement thereof after being clamped in position.

Des Moines, Iowa, February 6, 1928.

ALGOT W. NORDGREN.